(12) United States Patent
Mock et al.

(10) Patent No.: US 7,997,803 B2
(45) Date of Patent: Aug. 16, 2011

(54) MULTI-ROW ANTI-FRICTION BEARING

(75) Inventors: Christian Mock, Schweinfurt (DE);
Peter Niebling, Bad Kissingen (DE);
Ralf Heiss, Schweinfurt (DE); Darius Dlugai, Schweinfurt (DE); Berthold Krautkraemer, Gochsheim (DE)

(73) Assignee: Schaeffler KG, Herzogenaurach (DE)

( * ) Notice: Subject to any disclaimer, the term of this patent is extended or adjusted under 35 U.S.C. 154(b) by 438 days.

(21) Appl. No.: 12/162,726

(22) PCT Filed: Jan. 18, 2007

(86) PCT No.: PCT/DE2007/000080
§ 371 (c)(1),
(2), (4) Date: Aug. 5, 2008

(87) PCT Pub. No.: WO2007/087777
PCT Pub. Date: Aug. 9, 2007

(65) Prior Publication Data
US 2009/0010583 A1 Jan. 8, 2009

(30) Foreign Application Priority Data
Jan. 31, 2006 (DE) .......................... 10 2006 004 274

(51) Int. Cl.
*F16C 19/08* (2006.01)

(52) U.S. Cl. ....................................... 384/544; 384/504
(58) Field of Classification Search .................. 384/494, 384/504, 512, 544, 589
See application file for complete search history.

(56) References Cited

U.S. PATENT DOCUMENTS

| | | | | |
|---|---|---|---|---|
| 918,422 | A * | 4/1909 | Coppins | 384/544 |
| 4,333,695 | A | 6/1982 | Evans | |
| 4,668,111 | A | 5/1987 | Kapaan | |
| 7,104,695 | B2 * | 9/2006 | Shevket | 384/450 |
| 7,350,977 | B2 * | 4/2008 | Fukuda et al. | 384/512 |
| 2005/0031240 | A1 * | 2/2005 | Dodoro et al. | 384/494 |

FOREIGN PATENT DOCUMENTS

| | | |
|---|---|---|
| DE | 103 31 936 XY | 2/2005 |
| DE | 10 2004 020851 X | 11/2005 |
| EP | 1 361 373 XY | 11/2003 |
| GB | 206 606 XY | 11/1923 |
| WO | 93/17251 XY | 9/1993 |
| WO | 2005/065077 XY | 7/2005 |

* cited by examiner

Primary Examiner — Thomas R Hannon
(74) Attorney, Agent, or Firm — Lucas & Mercanti, LLP

(57) ABSTRACT

The invention relates to an anti-friction bearing comprising a first bearing race, a second bearing race and a plurality of anti-friction bodies that are located between the first bearing race and the second bearing race. According to the invention, the anti-friction bodies are arranged in several rows and the pitch diameters of at least two rows differ.

12 Claims, 5 Drawing Sheets

MULTI-ROW ANTI-FRICTION BEARING

FIELD OF THE INVENTION

The present invention is aimed at an asymmetrical anti-friction bearing and in particular at a multi-row asymmetrical anti-friction bearing.

The invention is described with reference to a wheel bearing unit for driven or non-driven wheels of motor vehicles, such as for example of pickup trucks, light tucks or SUVs (sports utility vehicles). It is also pointed out that the present invention may also be used in other anti-friction bearings.

The prior art discloses anti-friction bearings which have an outer ring, an inner ring and rolling bodies arranged between said outer ring and inner ring. It is also known from the prior art to arrange said rolling bodies in two or more rows. In this way, it is possible to distribute the loads acting on the bearing between a plurality of rows of rolling bodies.

The geometric center of the rows of rolling bodies in the axial direction is referred to below as the bearing center.

In many applications, however, the bearing center of the respective wheel bearing and the wheel action line do not correspond to one another. For example, it is possible in a wheel suspension of a vehicle that the center of contact of the wheel or tire lies toward the outside of the vehicle in relation to the bearing center. In this case, forces are distributed non-uniformly between the bearing rows.

The present invention is therefore based on the problem of providing an anti-friction bearing which is capable of absorbing even non-uniform forces which are caused for example by the bearing center and the line of force action not coinciding. This is achieved according to the invention by means of an anti-friction bearing according to claim 1.

Advantageous embodiments and refinements are the subject matter of the subclaims.

The anti-friction bearing according to the invention has a first bearing ring and a second bearing ring and a plurality of rolling bodies arranged between the first bearing ring and the second bearing ring. Here, the rolling bodies are arranged in a plurality of rows, with the pitch circle diameters of at least two of said rows differing. A pitch circle diameter is to be understood to mean the spacing between the central point of one rolling body and the central point of the rolling body which is situated exactly opposite.

The pitch circle diameters of at least two rows which are symmetrical with respect to one another about a central plane of the anti-friction bearing preferably differ. In this case, the anti-friction bearing is formed asymmetrically with respect to said central plane.

The row with the larger pitch circle diameter can absorb a greater force and it is therefore possible by means of the different pitch circle diameters to allow for the fact that forces act on the anti-friction bearing outside the bearing center. The row with the larger pitch circle diameter offers larger rolling contact surfaces for absorbing forces, which leads to reduced contact pressure.

In one preferred embodiment, at least four rows of rolling bodies are provided. Here, a row is to be understood to mean that the rolling bodies are arranged substantially annularly between the inner ring and the outer ring.

In one preferred embodiment, the pitch circle diameter of at least one row which is situated at the outside with respect to the anti-friction bearing is greater than each of the pitch circle diameters of one of the other rows. This means that an outer row has a greater pitch circle diameter compared to the other rows. The outer row can thereby also absorb the greatest forces. The row with the greatest pitch circle diameter is preferably arranged relative to the bearing center on that side at which the eccentric forces also act on the wheel bearing.

In a further preferred embodiment, the sum of the pitch circle diameters of two adjacent rows is greater than the sum of the pitch circle diameters of two further adjacent rows. This means, for example, that the sum of the pitch circle diameters of the two adjacent rows arranged on a given side relative to the bearing center is greater than the sum of the pitch circle diameters of the rows arranged on the other side of the bearing center. In this way, the rows with the greater sum total of pitch circle diameters can absorb greater forces and are therefore likewise suitable for the eccentric introduction of forces into the anti-friction bearing. Here, it is possible for the inner rows, that is to say the rows situated closer to the bearing center, to have the same pitch circle diameter and for the different sums to result merely from the different pitch circle diameters of the outer rows.

In a further preferred embodiment, the pitch circle diameter of a flange-side outer row is greater than each of the pitch circle diameters of one of the other rows. A flange-side outer row is to be understood to mean that row which is arranged closest to the flange of the wheel carrier to which the wheel rim and the tire are fastened. The flange-side outer row is therefore the row situated to the outside of the vehicle. Said embodiment is selected if the center of contact of the wheel lies toward the outside of the vehicle in relation to the bearing center. It is however also possible for the center of contact of the wheel to lie toward the inside of the vehicle—also referred to below as the carrier side—in relation to the bearing center. In this case, the pitch circle diameter of the carrier-side outer row would be selected to be larger than each of the pitch circle diameters of one of the other rows.

The sum of the pitch circle diameters of two adjacent rows arranged at the flange side is preferably greater than the sum of the pitch circle diameters of two adjacent rows arranged at the carrier side. Conversely, it is also possible for the sum of the pitch circle diameters of two adjacent rows arranged at the carrier side to be greater than the sum of the pitch circle diameters of two adjacent rows arranged at the flange side.

Said embodiments are used, as stated above, depending on whether the wheel action line of the center of contact of the wheel on the anti-friction bearing is offset toward the outside of the vehicle or toward the inside of the vehicle with respect to the bearing center.

In a further advantageous embodiment, the outer ring has a predefined flange-side outer diameter and a carrier-side outer diameter which differs from said flange-side outer diameter. This means that the diameter of the outer ring also varies along the length of the anti-friction bearing. By means of said embodiment, it can be obtained that a certain wall thickness of the outer ring can be maintained even in the event of pitch circle diameters of different size.

In a further advantageous embodiment, the rolling bodies are selected from a group of rolling bodies which comprises balls, cylindrical rollers, cones and the like. Here, it is possible for the same generic type of rolling bodies, for example balls, to be arranged in all the rows of a bearing. However, it is also possible for different rows of the anti-friction bearing to be fitted with different generic types of rolling bodies, for example one row fitted with balls and a further row fitted with cylindrical rollers. In this way, it is possible in an optimum fashion to allow for the force conditions acting on the anti-friction bearing.

In a further preferred embodiment, the diameters of the rolling bodies of at least two rows are different. For example, it is possible for rows which have a larger pitch circle diameter to also be fitted with rolling bodies with a greater diameter. Conversely, it would also be possible to select the rolling bodies of all the rows to have the same diameter, as a result of which it would be necessary to arrange a higher number of rolling bodies in the rows with the greater diameter.

The rolling bodies with the greater diameter are preferably provided in the outer rows arranged in each case at the flange side or at the carrier side.

In a further embodiment, all the rows have the same pressure angle. This means that the raceways in the outer and inner rings are arranged such that the transmission of force takes place at substantially the same angle with respect to the rotational axis of the bearing in all the rows.

It is however also possible for the pressure angle of at least two rows to be different. It is possible by means of the selection of this pressure angle, too, to adapt the wheel bearing to the respective requirements, that is to say to the forces to be absorbed in each case or the directions thereof. The pressure angles of the outer rows are preferably greater than the pressure angles of the inner rows.

It is also possible for all the rows to have the same rim angle; it is however also possible here for the rim angles of at least two rows to be different.

In a further preferred embodiment, at least one bearing ring is formed in two parts. Said bearing ring is preferably the inner bearing ring, the one part of which carries the raceways for two rows of rolling bodies and the second part of which carries the other raceways for the remaining rows.

Here, it is possible for the respective bearing ring halves to be braced against one another by means of a rim collar.

In a further preferred embodiment, the anti-friction bearing has a device for measuring the wheel rotational speed. Said device may for example be a magnetic disk which outputs an alternating signal to a sensor as a result of a rotation.

The following invention is also aimed at a wheel bearing having an anti-friction bearing of the above-described type.

Further advantages and embodiments can be gathered from the appended drawings, in which.

Figure 1:
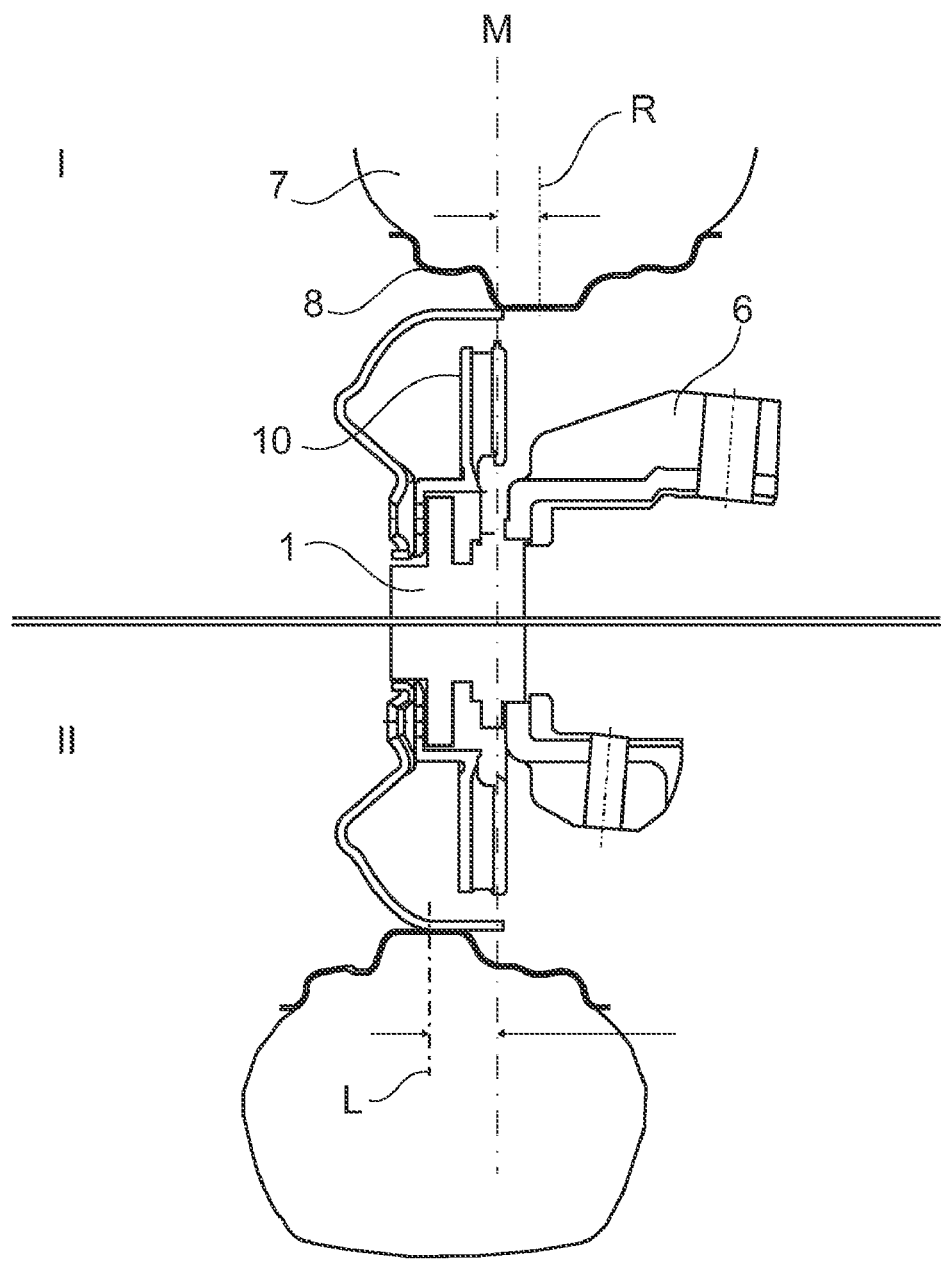
FIG. 1 is a schematic illustration showing the problem on which the invention is based.

FIG. 1 is a schematic illustration showing the problem on which the invention is based. Here, the reference numeral 1 relates to a wheel bearing which is not illustrated in full detail. Said wheel bearing has a bearing center M. In the upper partial FIG. 1, a tire 7 which is arranged on a wheel rim 8 has been moved laterally to the right with respect to said bearing center M, as indicated by the line R. The tire in the upper Figure part I has therefore been moved in the direction of a wheel carrier 6 with respect to the bearing center M. The center of contact of the wheel is therefore situated toward the inside of the vehicle relative to the bearing center M.

This has the result that forces acting on the wheel or the tire 7 are transmitted via the bearing not centrally but rather laterally offset with respect thereto. In this way, the bearing is subjected to a greater loading on the side which faces toward the wheel carrier 6 than on the other side. In the lower Figure part II, the center of contact of the wheel lies toward the outside of the vehicle relative to the bearing center M, as indicated by the line of force action L. In this case, that side of the bearing which is situated toward the outside of the vehicle with respect to the bearing center M is subjected to a greater loading. The reference numeral 10 relates to a brake disk.

Figure 2:
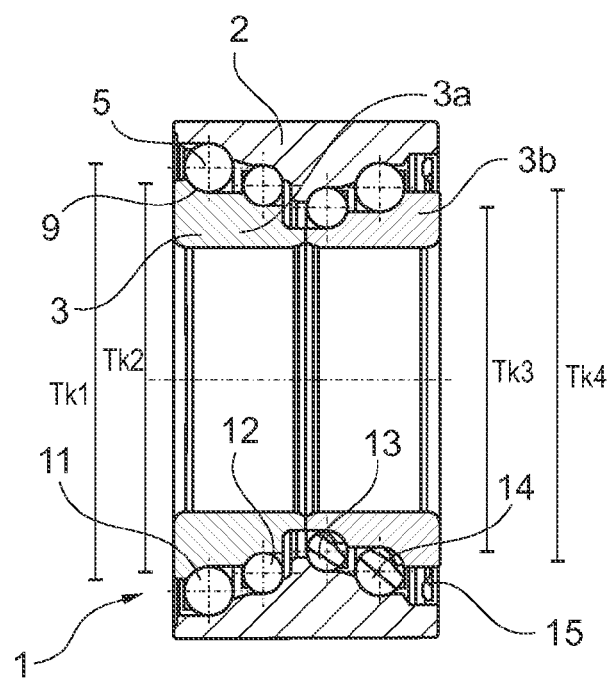
FIG. 2 shows an anti-friction bearing according to the invention in a first embodiment.

FIG. 2 shows an anti-friction bearing according to the invention in a first embodiment. Said anti-friction bearing has an outer bearing ring 2 and an inner bearing ring 3. In the embodiment shown in FIG. 1, the inner bearing ring 3 is formed in two parts and has two inner ring halves 3a and 3b.

The anti-friction bearing shown in FIG. 2 has four rows 11, 12, 13 and 14, in each of which are arranged rolling bodies 5. Here, the rolling bodies 5 are arranged in each case in rings and run in a plane perpendicular to the plane of the Figure.

The individual rolling bodies (5) may run in bearing cages (not shown in detail).

The reference numeral 15 relates to sealing devices for sealing off the anti-friction bearing 1.

As shown in FIG. 2, the individual rows 11, 12, 13 and 14 have different pitch circle diameters which, as mentioned in the introduction, extend from the spacing from a rolling body center of one rolling body to an opposite rolling body, and again to the rolling body center of the latter.

In the embodiment shown in FIG. 2, the row 11 has the greatest pitch circle diameter Tk1 and the row 13 has the smallest pitch circle diameter Tk3. The rows 11 and 12 at the vehicle outside therefore always have a greater sum total of pitch circle diameters than the rows 13 and 14 at the vehicle inside or carrier side, and the anti-friction bearing shown in FIG. 1 is therefore particularly suitable for situations in which the center of contact of the wheel is situated toward the outside of the vehicle, or flange side, relative to the bearing center.

Figure 3:
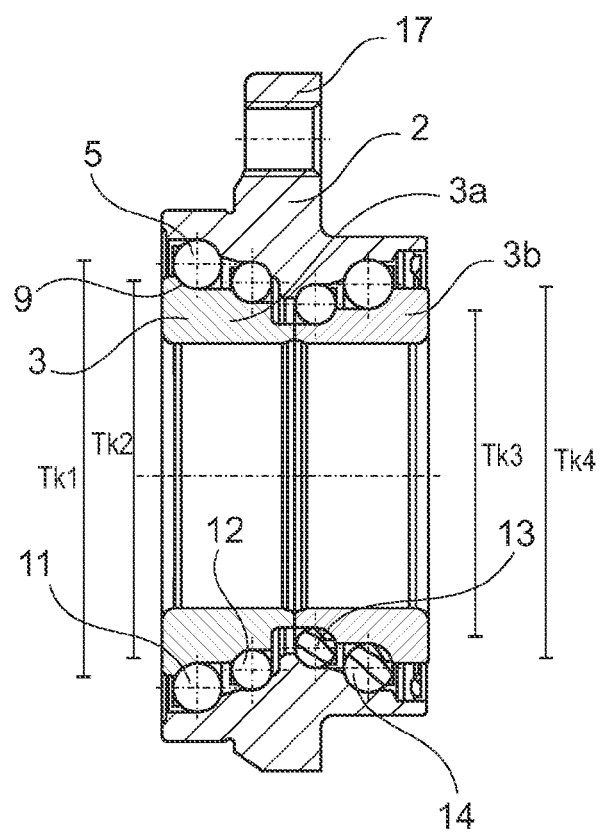
FIG. 3 shows an anti-friction bearing according to the invention in a second embodiment.

FIG. 3 shows a bearing arrangement according to the invention in a second embodiment. In contrast to the embodiment shown in FIG. 1, a flange 17 is arranged on the outer bearing ring 2 in this embodiment. Said flange may be connected to the carrier or to a wheel. The rolling bodies 5 of the individual rows 11, 12, 13 and 14 have in each case different diameters, with the diameters of the rolling bodies of the in each case outer rows 11 and 14 being greater than the diameters of the rolling bodies of the in each case inner rows 12 and 13 in this embodiment.

It would however also be possible for the individual rolling bodies 5 of all the rows to have substantially the same diameter.

By means of the arrangement of the respective rows with the different pitch circle diameters, as stated above, the eccentric introduction of load is counteracted, and both the resistance to tilting and also the load capacity of the bearing are increased.

Figure 4:
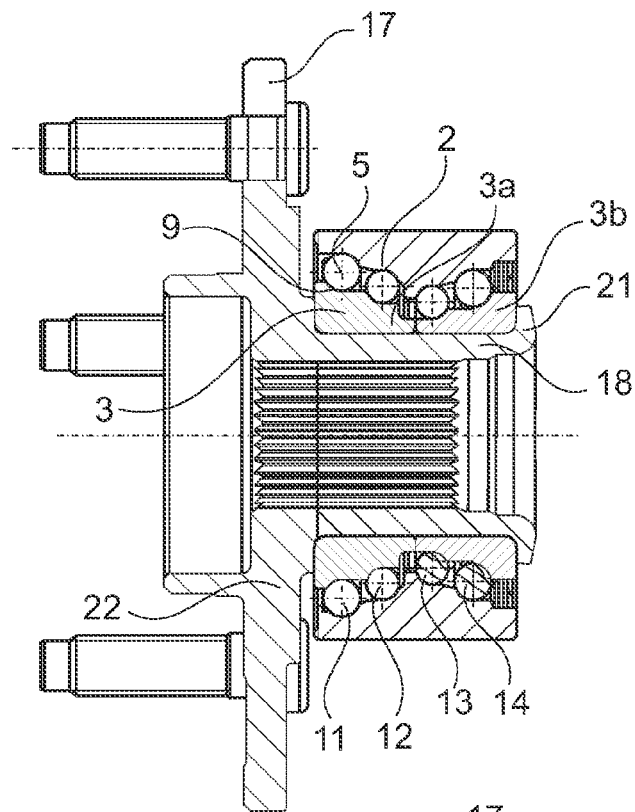
FIG. 4 shows an anti-friction bearing according to the invention in a third embodiment.

FIG. 4 shows a further embodiment of the bearing according to the invention. In contrast to the embodiment shown in FIG. 3, here, a flange 17 is arranged not on the outer ring 2 but rather on a flange body 18 which is rotatable with respect to the outer ring 2. The two inner ring halves 3a and 3b are in each case held together, or braced axially, by means of a flanged edge 21 on the one hand and the shoulder 22 on the flange body.

The inner ring 3 is or the inner ring halves 3a and 3b are thereby rotationally fixedly connected to the flange bodies. Each of the inner ring halves 3a and 3b has two raceways 9 for the rolling bodies.

The embodiment of the inner bearing ring 3 in the form of two inner ring halves 3a and 3b is advantageous for assembly, since it is also possible in this way for inner rows 12 and 13 to be arranged easily in each case.

Figure 5:
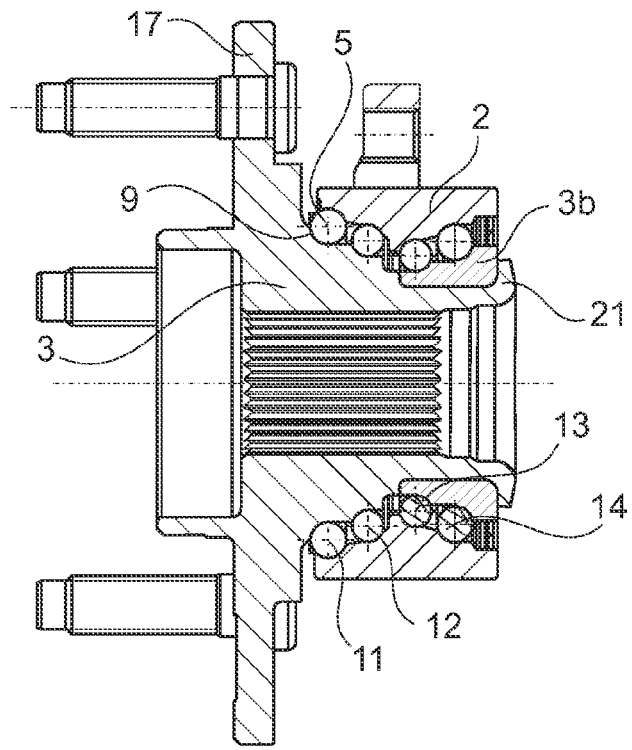
FIG. 5 shows an anti-friction bearing according to the invention in a fourth embodiment.

FIG. 5 shows a further embodiment of the anti-friction bearing according to the invention. In contrast to the embodiment shown in FIG. 4, here, the two inner bearing ring halves 3a and 3b are not provided, but rather only the inner ring half 3b. The raceways 9 for the rolling bodies of the rows 11, 12 are in this case arranged directly on the flange body 18 (which is formed in one piece with the flange 17). It can be seen that, in the embodiment shown in FIGS. 4 and 5, although the rolling bodies in the rows 12 and 13 are of equal diameter, the pitch circle diameter of the row 11 is slightly greater than the pitch circle diameter of the row 14. Here, the bearing ring halve 3b is braced against the flange body 18 by means of the flanged collar 21.

Figure 6:
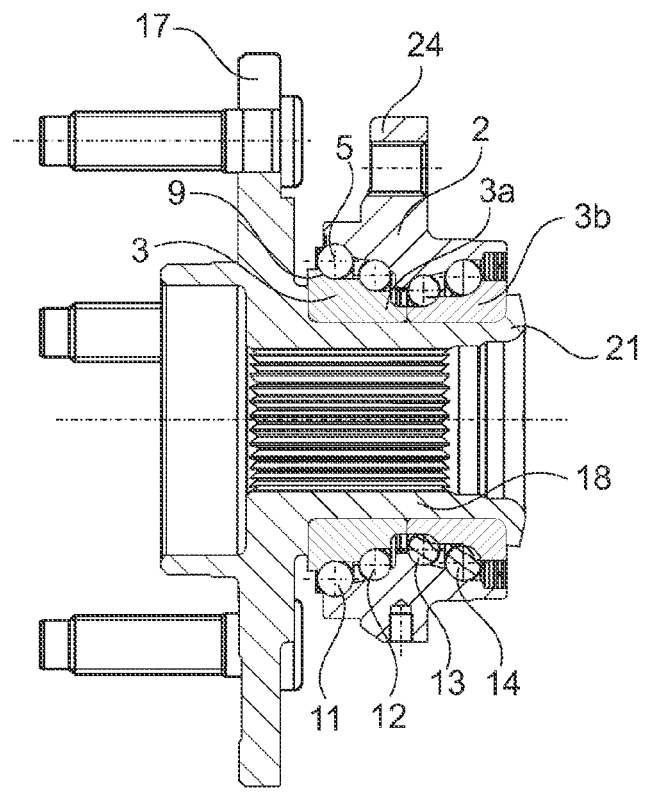
FIG. 6 shows an anti-friction bearing according to the invention in a fifth embodiment.

FIG. 6 shows a further embodiment of an anti-friction bearing according to the invention. Here, too, a flanged collar 21 is provided which presses the two inner ring halves 3a and 3b against the shoulder 11 of the flange body 18. In contrast to the embodiments shown in the preceding Figures, however, two flanges 17 and 24 are provided here, with the flange 24 being arranged on the outer bearing ring 2. It can also be seen that the diameter of the outer bearing ring 2 in the direction of the flange 17 is greater than the diameter in the direction of the wheel carrier (not shown), that is to say to the right in FIG. 6.

Figure 7:
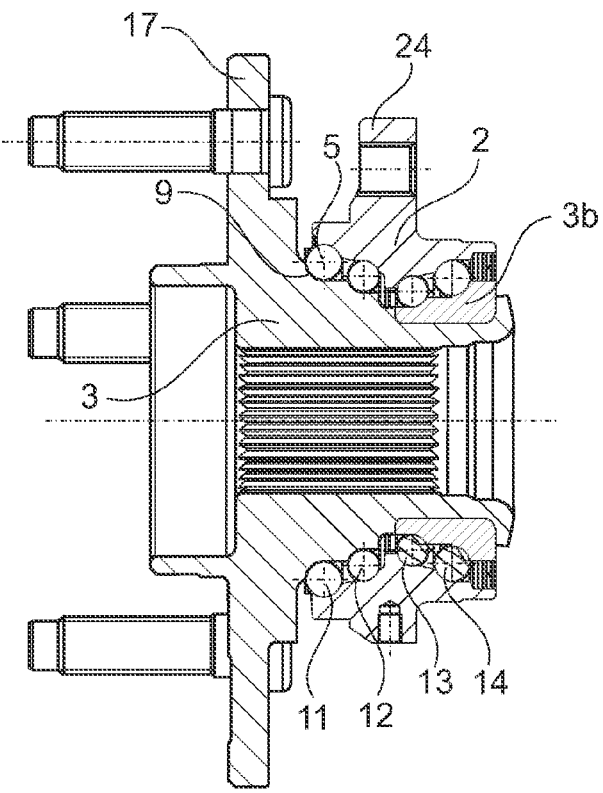
FIG. 7 shows an anti-friction bearing according to the invention in a sixth embodiment.

FIG. 7 shows a further embodiment of an anti-friction bearing according to the invention. Said embodiment is similar to that of FIG. 5, but with a second flange 24 being arranged on the outer bearing ring 2 here too.

Figure 8:
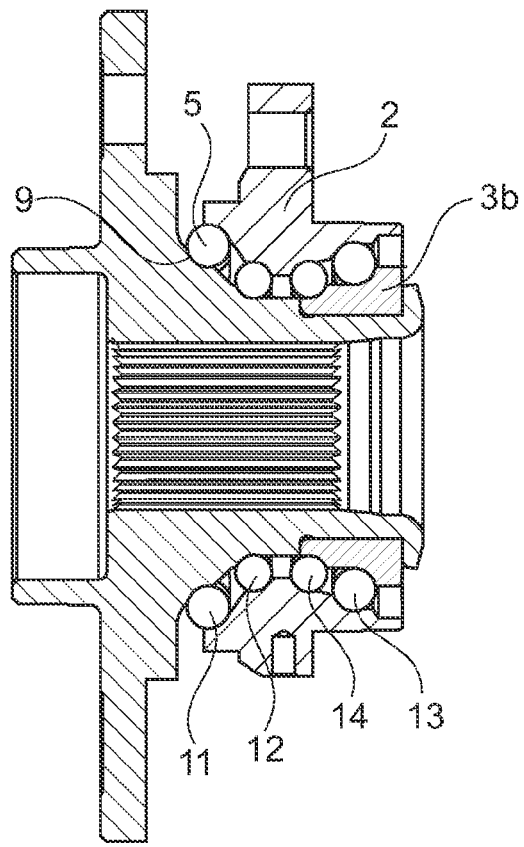
FIG. 8 shows an anti-friction bearing according to the invention in a seventh embodiment.
Figure 9:
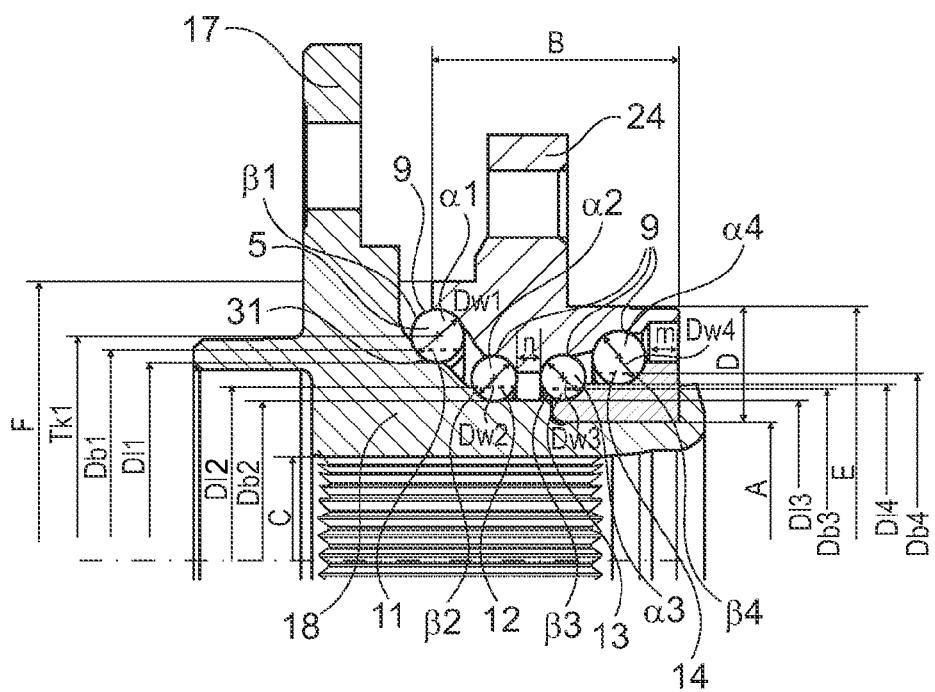
FIG. 9 shows a partial illustration of a bearing according to the invention, showing the geometries.

FIG. 8 shows a further embodiment of a bearing according to the invention. The embodiment shown in FIG. 8 and the illustrations shown in FIG. 9 for showing the geometries are described together. In FIG. 9, the reference symbol B denotes the overall bearing width and the reference symbol D denotes the bearing height, that is to say the spacing between a radially inwardly pointing surface of the inner bearing ring 3 and a radially outwardly pointing surface of the outer bearing ring 2, neglecting the flange 24. The reference symbol F denotes the flange-side outer diameter of the outer ring and the reference symbol E denotes the outer diameter of the anti-friction bearing at the vehicle inside or carrier side.

The reference symbol A denotes the bore diameter of the anti-friction bearing. The reference symbols Dw1-Dw4 denote the individual diameters of the respective rolling bodies; for example, the reference symbol Dw1 denotes the diameter of a rolling body 5 in the row 11. The reference symbols Tk1-Tk4 denote the individual pitch circle diameters of the respective rows. The reference signs Db1-Db4 denote the respective rim diameter of the individual rows.

The reference symbols Dl1-Dl4 (only diameter Dl1 shown here) denote the respective raceway base diameter, and is measured from that section of a raceway 31 which lies radially at the inside. The reference symbol N denotes the width of the central rim between the rows 12 and 13.

The reference symbol m denotes the rim width of the inner ring or of the inner ring half 3b on that side which faces toward the vehicle inside. The reference symbols $\alpha_1$-$\alpha_4$ denote in each case the pressure angles of the inner raceways 31-34; the reference symbols $\beta_1$-$\beta_4$ denote in each case the rim angle of the inner raceways 31-34.

Since the anti-friction bearing shown in FIGS. 8 and 9 is also designed for the case in which the force is introduced into the wheel bearing from the outside with respect to the anti-friction bearing center, that is to say from the flange side, the geometric conditions described below apply in this case. The sum of the pitch circle diameters Tk1 and Tk2 is preferably greater than the sum of the pitch circle diameters Tk3 and Tk4. In addition, the flange-side outer diameter F is also greater than the carrier-side outer diameter E. In the inverse embodiment, the sum of the pitch circle diameters Tk3 and Tk4 would be greater than the sum of the pitch circle diameters Tk1 and Tk2, and the carrier-side outer diameter E of the outer ring would also be greater than the flange-side outer diameter F.

In the embodiment shown in FIG. 9, the overall bearing width B is greater than the sum of all the rolling body diameters plus the rim width of the inner ring m and the central rim width n. In addition, in the embodiment shown in FIG. 9, the overall bearing width is greater than 35 mm.

The in each case outer rows have greater pitch circle diameters. This means that the pitch circle diameter of the row 11 is greater than the pitch circle diameter of the row 12, and the pitch circle diameter of the row 14 is greater than the pitch circle diameter of the row 13.

In the embodiment shown in FIG. 9, the outer diameter of the outer ring E at the vehicle inside is greater than the sum of the pitch circle diameter Tk4 and the diameter Dw4 of the rolling bodies in the row 14. The carrier-side outer diameter E is preferably at least 6 mm greater than the sum stated above.

The pitch circle diameter Tk3 minus the rolling body diameter Dw3 is preferably at least 3.5 mm greater than the bore diameter A. The flange-side outer diameter F is greater than the pitch circle diameter Tk1 of the row 11 plus the rolling body diameter Dw1. The vehicle-side outer diameter is preferably at least 6 mm greater than the sum stated above.

Furthermore, in the embodiment shown in FIG. 9, the respective rim angles $\beta_1$ and $\beta_4$ of the raceways of the rows 11 and 14 are greater than or equal to the rim angles $\beta_2$, $\beta_3$ of the inner raceways of the rows 12 and 13. Here, the angles are specified in relation to the bearing longitudinal axis. This means that the pressure angles of the outer rows, that is to say the angles under which the forces are transmitted from the outer ring to the inner ring, are greater in the outer rows than the pressure angle of the inner rows. It would however also be possible for the pressure angles of all the rows to be equal.

All the features disclosed in the application are claimed as being essential to the invention if novel, individually or in combination, over the prior art.

LIST OF REFERENCE SYMBOLS

1 Wheel bearing
2 Outer bearing ring
3 Inner bearing ring
3a, 3b Inner ring halves
5 Rolling bodies
6 Wheel carrier
7 Tire
8 Wheel rim
9 Raceway
10 Brake disk
11, 12, 13, 14 Rows
15 Sealing device
17 Flange
18 Flange body
21 Flanged edge
22 Shoulder 24 Flange
31 Radially inner section of a raceway
A Bore diameter
B Overall bearing width
D Bearing height
E Vehicle-inner-side or carrier-side outer diameter
F Flange-side outer diameter
M Bearing center
n Central rim width
m Rim width of the inner ring
R, L Lines of force action
Db1-Db4 Rim diameter of the individual rows
Dl1-Dl4 Raceway base diameter
Dw1-Dw4 Diameter of the respective rolling bodies
Tk1-Tk4 Pitch circle diameter
I, II Part-Figure (FIG. 1)
$\alpha 1, \alpha 2, \alpha 3, \alpha 4$ Pressure angle
$\beta 1, \beta 2, \beta 3, \beta 4$ Rim angle

The invention claimed is:

1. An anti-friction bearing having a flange side and a carrier side, comprising:
   a first bearing ring;
   a second bearing ring; and
   a plurality of rolling bodies arranged between the first bearing ring and the second bearing ring,
   wherein the rolling bodies are arranged in at least four rows and the pitch circle diameters of at least two rows differ, and
   wherein a sum of the pitch circle diameters of two adjacent rows arranged at the flange side is greater than a sum of the pitch circle diameters of two adjacent rows arranged at the carrier side.

2. The anti-friction bearing as claimed in claim 1, wherein the pitch circle diameter of at least one outer row is greater than each of the pitch circle diameters of the other rows.

3. The anti-friction bearing as claimed in claim 1, wherein the pitch circle diameter of a flange-side outer row is greater than each of the pitch circle diameters of the other rows.

4. The anti-friction bearing as claimed in claim 1, wherein the pitch circle diameter of a carrier-side outer row is greater than each of the pitch circle diameters of the other rows.

5. The anti-friction bearing as claimed in claim 1, wherein at least the first bearing ring has a predefined flange-side outer diameter and a carrier-side outer diameter which differs from said flange-side outer diameter.

6. The anti-friction bearing as claimed in claim 1, wherein the rolling bodies are selected from a group of rolling bodies which comprises balls, cylindrical rollers, and cones.

7. The anti-friction bearing as claimed in claim 1, wherein the diameters of the rolling bodies of at least two rows are different.

8. The anti-friction bearing as claimed in claim 1, wherein all the rows have the same pressure angle and/or the same rim angle.

9. The anti-friction bearing as claimed in claim 1, wherein pressure angles and/or the rim angles of at least two rows are different.

10. The anti-friction bearing as claimed in claim 1, wherein at least one bearing ring is formed in two parts.

11. A wheel bearing having an anti-friction bearing as claimed in claim 1.

12. An anti-friction bearing having a flange side and a carrier side, comprising:
    a first bearing ring;
    a second bearing ring; and
    a plurality of rolling bodies arranged between the first bearing ring and the second bearing ring,
    wherein the rolling bodies are arranged in at least four rows and pitch circle diameters of at least two rows differ, and
    wherein a sum of the pitch circle diameters of two adjacent rows arranged at the carrier side is greater than a sum of the pitch circle diameters of two adjacent rows arranged at the flange side.

* * * * *